(12) United States Patent
Yang et al.

(10) Patent No.: US 12,111,541 B2
(45) Date of Patent: Oct. 8, 2024

(54) DISPLAY DEVICE

(71) Applicant: Xiamen Tianma Micro-Electronics Co., Ltd., Xiamen (CN)

(72) Inventors: Yan Yang, Xiamen (CN); Ling Wu, Xiamen (CN); Boping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 918 days.

(21) Appl. No.: 17/053,349

(22) PCT Filed: Nov. 11, 2019

(86) PCT No.: PCT/CN2019/117274
§ 371 (c)(1),
(2) Date: Nov. 5, 2020

(87) PCT Pub. No.: WO2020/258649
PCT Pub. Date: Dec. 30, 2020

(65) Prior Publication Data
US 2023/0096807 A1 Mar. 30, 2023

(30) Foreign Application Priority Data
Jun. 27, 2019 (CN) .......................... 201910569769.8

(51) Int. Cl.
*G02F 1/1335* (2006.01)
*G02F 1/1343* (2006.01)
*G09G 3/34* (2006.01)

(52) U.S. Cl.
CPC .. *G02F 1/133612* (2021.01); *G02F 1/133531* (2021.01); *G02F 1/134336* (2013.01); *G09G 3/3426* (2013.01)

(58) Field of Classification Search
None
See application file for complete search history.

(56) References Cited

U.S. PATENT DOCUMENTS

| 2018/0164622 | A1  | 6/2018 | Non |
| 2018/0210595 | A1* | 7/2018 | Cao ....................... G06F 3/0445 |
| 2020/0103687 | A1* | 4/2020 | Chang ............... G02F 1/134309 |

FOREIGN PATENT DOCUMENTS

| CN | 1645446 A   | 7/2005 |
| CN | 104503161 A | 4/2015 |
| CN | 104570514 A | 4/2015 |
| CN | 105487277 A | 4/2016 |
| CN | 106653770 A | 5/2017 |
| CN | 106782382 A | 5/2017 |

(Continued)

*Primary Examiner* — Thanh Nhan P Nguyen
(74) *Attorney, Agent, or Firm* — KILPATRICK TOWNSEND & STOCKTON LLP

(57) ABSTRACT

The present disclosure discloses a display device. The display device includes a first display structure, a second display structure and a backlight device. The first display structure includes first pixels arranged in an array, the first pixels are divided into multiple dimming areas, and each dimming area includes at least one first pixel. The first display structure is for adjusting the transmittance of each dimming area for lights emitted by the backlight device according to an image to be displayed in the next frame of the second display structure.

9 Claims, 14 Drawing Sheets

(56) References Cited

FOREIGN PATENT DOCUMENTS

| | | | |
|---|---|---|---|
| CN | 107430299 | A | 12/2017 |
| CN | 107817922 | A | 3/2018 |
| CN | 108073331 | A | 5/2018 |
| CN | 109298573 | A | 2/2019 |
| CN | 109407429 | A | 3/2019 |
| CN | 109471300 | A | 3/2019 |
| CN | 109581760 | A | 4/2019 |
| CN | 110361899 | A | 10/2019 |
| WO | 2014054500 | A1 | 4/2014 |

\* cited by examiner

DISPLAY DEVICE

The present disclosure is a U.S. National Stage of International Application No. PCT/CN2019/117274, filed on Nov. 11, 2019, which claims the priority of a Chinese patent application No. 201910569769.8, filed with the Chinese Patent Office on Jun. 27, 2019, entitled "DISPLAY DEVICE", both of which are hereby incorporated by reference in their entireties.

FIELD

The present disclosure relates to the field of display, in particular to a display device.

BACKGROUND

Liquid crystal displays are non-self-luminous devices, and usually need to be provided with backlight devices, and the display function is achieved through backlight sources provided by the backlight devices. A backlight device generally includes light sources, the light sources may be direct light sources, in this case, the backlight device may include a light source substrate (such as a light emitting diode (LED) substrate) composed of multiple light sources, and the propagation direction of lights emitted by the light source substrate is perpendicular to the light-emitting surface of the backlight device.

When a backlight device including a light source substrate is adopted, the display contrast of liquid crystal displays can be improved advantageously. However, due to the size limitation of each light source on the light source substrate, when the liquid crystal displays need to display high-resolution images, it is difficult to achieve a smooth and fine transition between bright areas and dark areas, which limits improvement of the display effect.

Based on this, how to improve the display effect of liquid crystal displays is an urgent problem to be solved.

SUMMARY

An embodiment of the present disclosure provides a display device which includes:
a backlight device, a first display structure located above a light-emitting surface of the backlight device, and a second display structure located above a side, away from the backlight device, of the first display structure;
where the first display structure and the second display structure are opposite to each other; and
the first display structure includes first pixels arranged in an array, and
where the first pixels are divided into multiple dimming areas,
each dimming area includes at least one first pixel; and
the first display structure is for adjusting a transmittance of each dimming area for lights emitted by the backlight device according to an image to be displayed in a next frame of the second display structure.

DETAILED DESCRIPTION OF THE EMBODIMENTS

The implementation modes of a display device provided by embodiments of the present disclosure are described in detail below with reference to the accompanying drawings. It should be noted that the described embodiments are only a part of the embodiments of the present disclosure, but not all the embodiments.

Figure 1:
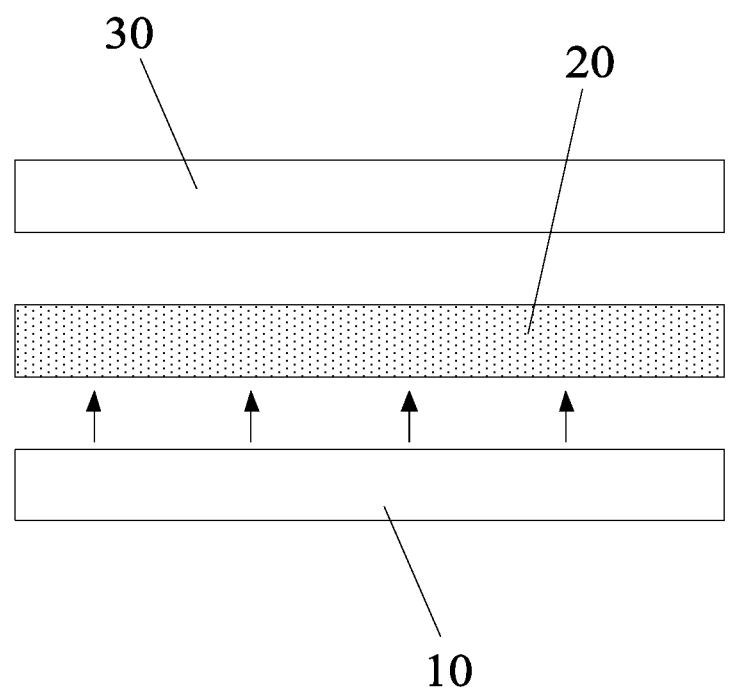
FIG. 1 is a cross-sectional view perpendicular to a light-emitting surface of a display device provided in an embodiment of the present disclosure.
Figure 2:
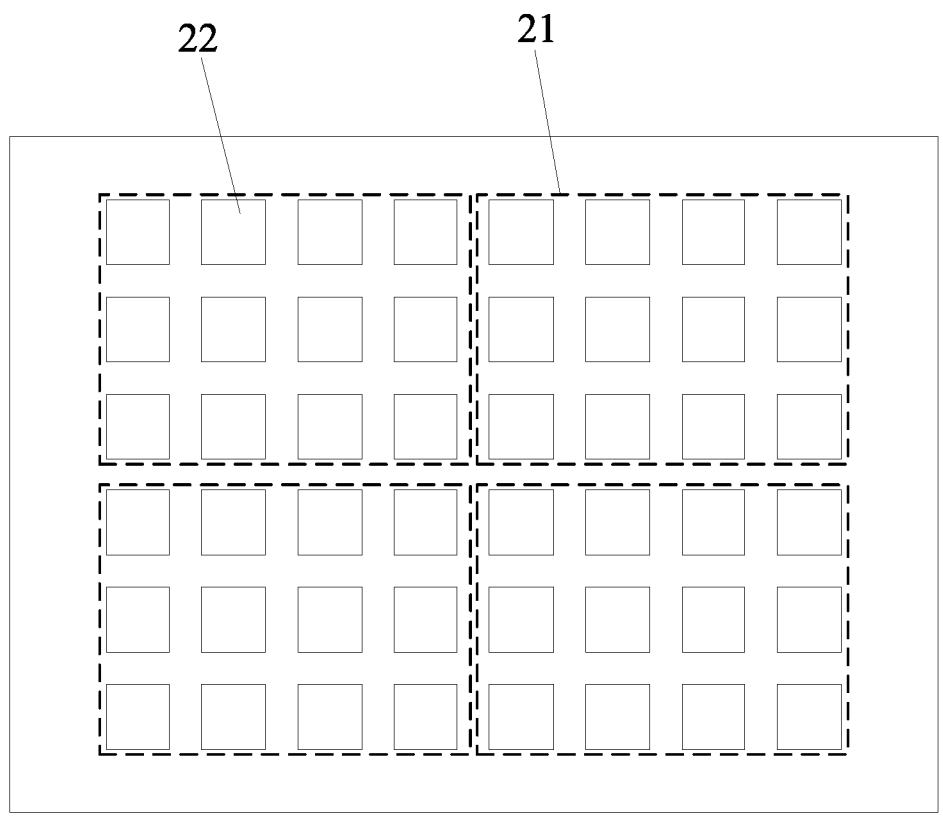
FIG. 2 is a schematic structural diagram of a first type of a first display structure provided in an embodiment of the present disclosure.
Figure 3:
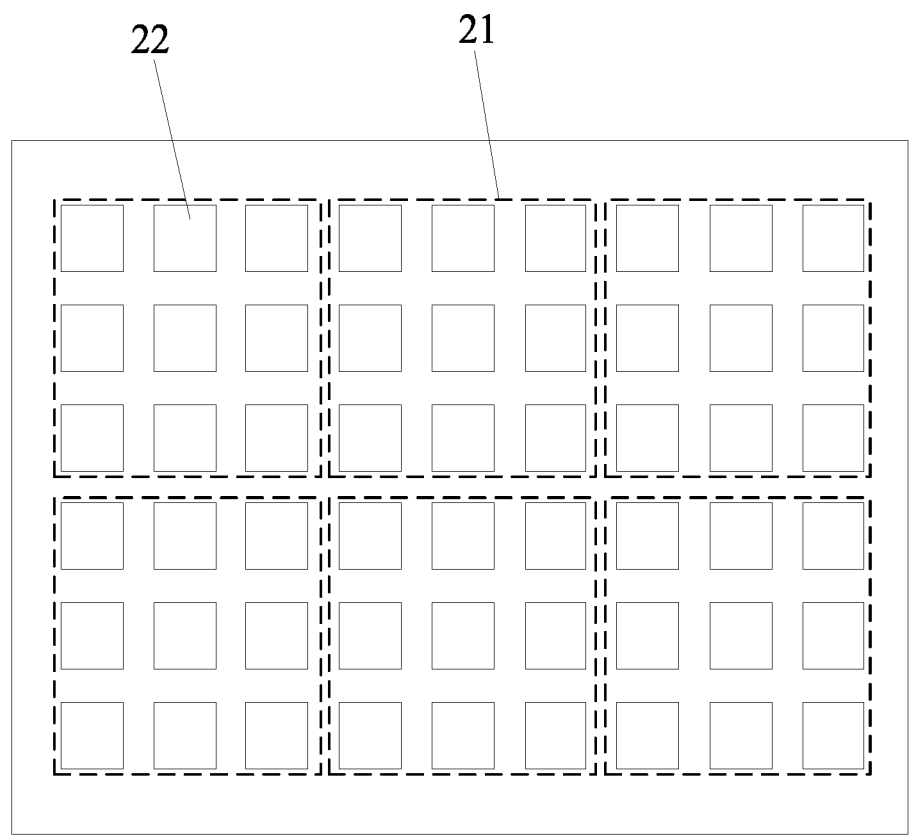
FIG. 3 is a schematic structural diagram of a second type of a first display structure provided in an embodiment of the present disclosure.
Figure 4:
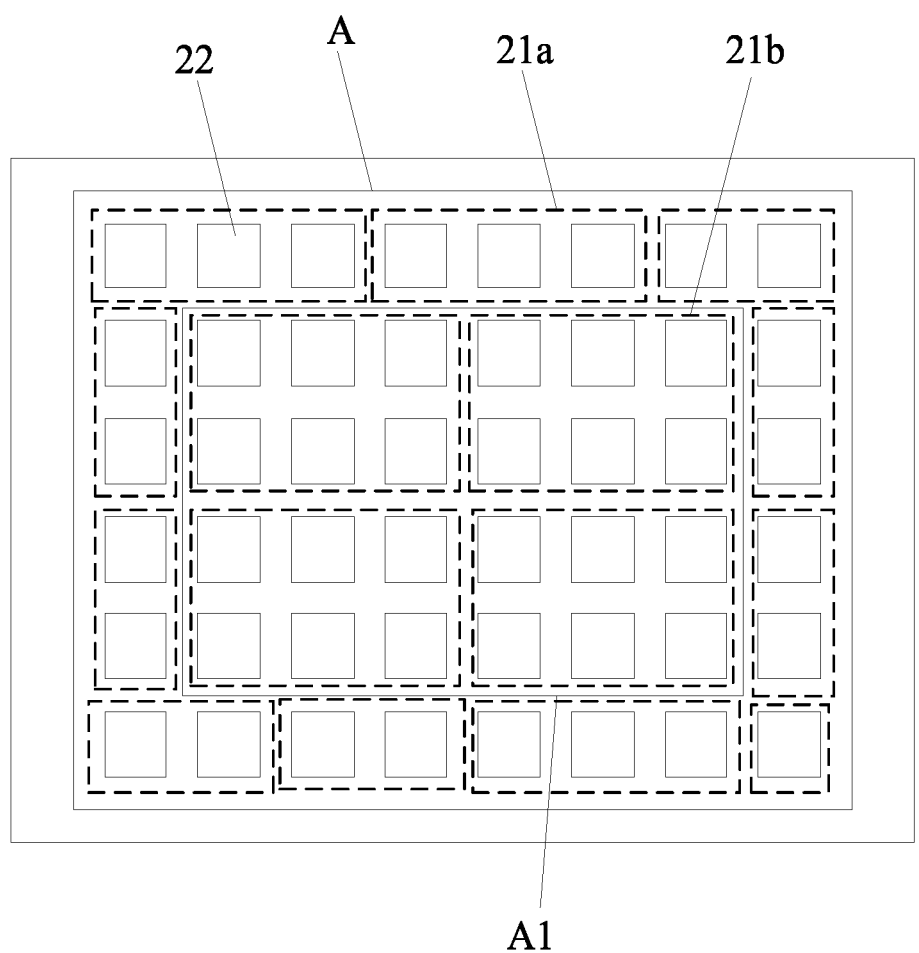
FIG. 4 is a schematic structural diagram of a third type of a first display structure provided in an embodiment of the present disclosure.

Embodiments of the present disclosure provide display devices, as shown in FIGS. 1 to 4. FIG. 1 is a cross-sectional view perpendicular to a light-emitting surface of the display device, FIG. 2 is a schematic structural diagram of a first type of a first display structure, FIG. 3 is a schematic structural diagram of a second type of a first display structure, and FIG. 4 is a schematic structural diagram of a third type of a first display structure.

Referring to FIG. 1, the display device includes a backlight device 10, a first display structure 20 located on a light-emitting surface of the backlight device 10, and a second display structure 30 located on the side, away from the backlight device 10, of the first display structure 20. The first display structure 20 and the second display structure 30 are opposite to each other, and referring to FIGS. 2 to 4, the first display structure 20 includes first pixels 22 arranged in an array, the first pixels 22 are divided into multiple dimming areas (such as 21 in FIGS. 2 and 3, and 21a and 21b in FIG. 4), and the dimming area includes at least one first pixel 22. The first display structure 20 is for adjusting the transmittance of each dimming area to lights emitted by the backlight device 10 according to an image to be displayed in the next frame of the second display structure 30.

It should be noted that the second display structure 30 is for displaying images through a backlight source transmitted through the first display structure 20, that is, the function of the second display structure 30 can be understood as image displaying. The first display structure 20 is for adjusting the transmittance of each dimming area to lights emitted by the backlight device 10 according to the image to be displayed in the next frame of the second display structure 30, that is, the function of the first display structure 20 is to control the transmittance of each dimming area to the backlight source emitted by the backlight device 10, and thus the function of the first display structure 20 can be understood as regional dimming according to the image to be displayed in the next frame of the second display structure 30.

Therefore, in the embodiment of the present disclosure, the first display structure 20 is mainly for regional dimming. Since the first display structure 20 includes the first pixels 22, an arrangement structure of the first pixels 22 may be similar to an arrangement structure of second pixels (which will be described below) in the second display structure 30, thus, the first pixels 22 may be relatively small and are not limited by the size of a light source in the backlight device 10, and then each dimming area in the first display structure 20 may be arranged to be small, when the display device needs to display a high-resolution image, the transition between areas with a large brightness difference in the second display structure may be fine and smooth through the function of the dimming areas, obvious boundaries are avoided, high-precision display can be achieved while achieving high-contrast display, and therefore the display effect is effectively improved.

It should also be noted that in the embodiments of the present disclosure, in order to realize the functions of the first display structure and the second display structure, the display device may further include a drive integrated circuit (IC) which is not shown in FIGS. 1 to 4, and the drive IC is electrically connected to the first display structure and the second display structure. When receiving a to-be-displayed signal, the drive IC processes the to-be-displayed signal to obtain a first control signal and a second control signal.

The first control signal may be understood as a control signal output to each dimming area in the first display structure for adjusting the transmittance of each dimming area to the backlight source to achieve regional dimming.

The second control signal may be understood as a control signal output to the second display structure to enable the second display structure to display images through a backlight source transmitted through the first display structure and to achieve the display function.

In some embodiments, the display device may be provided with two drive ICs, one of the drive ICs is located in the first display structure, and the other drive IC is located in the second display structure. The two drive ICs may be electrically connected or insulated, which may be arranged according to actual needs.

In order to enable the two drive ICs to work together effectively, the display device may also include a control structure (such as but not limited to a microcontroller or a microprocessor or a single-chip microcomputer hardware structure). The control structure is connected to the two drive ICs electrically, and the working process between the control structure and the two drive ICs may be as follows.

When the control structure receives a to-be-displayed signal, the control structure sends the to-be-displayed signal to the drive IC in the first display structure at first, so that the drive IC processes the to-be-displayed signal to obtain a control signal for adjusting the transmittance of each dimming area to the backlight source, and regional dimming is achieved. Meanwhile, the drive IC in the first display structure may provide feedback to the control structure to inform that the first display structure is working normally and can complete regional dimming normally.

After the control structure receives the feedback from the drive IC in the first display structure, the control structure sends the to-be-displayed signal to the drive IC in the second display structure to display images through a backlight source transmitted through the first display structure under the control of the drive IC, so that the display function is achieved.

The above description is only an example to illustrate the working process between the control structure and the two drive ICs. In one embodiment, the interaction process between the control structure and the two drive ICs is not limited to the above content, as long as the function of regional dimming of the first display structure, and the display function of the second display structure can be achieved by controlling the control structure and the two drive ICs, which is not limited herein.

The arrangements of the first pixels 22 are described below.

In one embodiment, in order to achieve the display function of the second display structure 30, in the embodiment of the present disclosure, the second display structure 30 includes second pixels arranged in an array. The area of the orthographic projections of the first pixels on the light-emitting surface of the display device may be larger than or equal to the area of the orthographic projections of the second pixels on the light-emitting surface of the display device.

In this way, the first pixels may be arranged according to actual needs, which greatly improves the design flexibility to meet the needs of various application scenes.

A structure in the first pixels may be arranged in the several following cases.

Case 1. In some embodiments of the present disclosure, the area of the orthographic projections of the first pixels on the light-emitting surface of the display device is equal to the area of the orthographic projections of the second pixels on the light-emitting surface of the display device. Each second pixel includes a second pixel electrode, each first pixel includes a first pixel electrode, and the orthographic projections of the first pixel electrodes and the orthographic projections of the second pixel electrodes on the light-emitting surface of the display device are in same shape.

Figure 5:
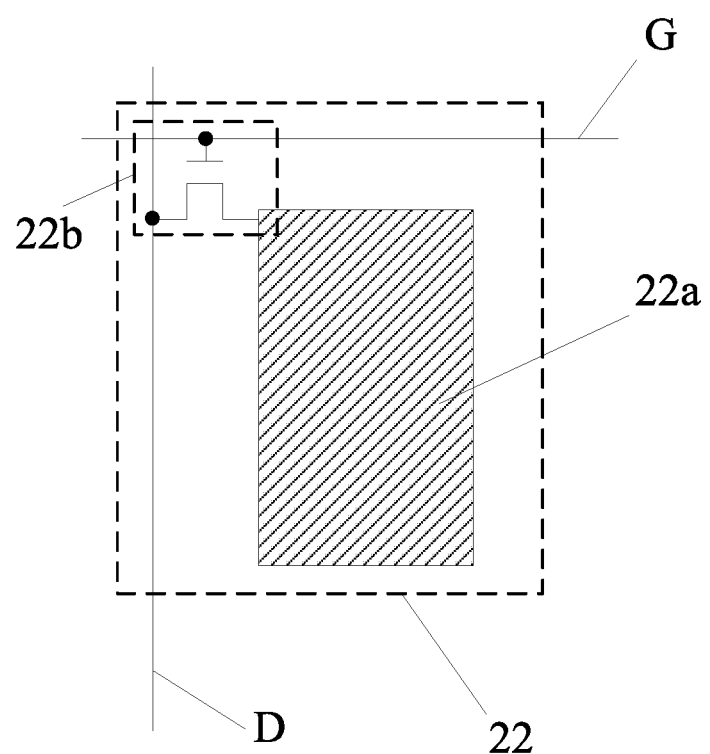
FIG. 5 is a schematic structural diagram of a first type of a first pixel provided in an embodiment of the present disclosure.

In one embodiment, but not limited to, a schematic structural diagram of a first type of a first pixel, as shown in FIG. 5, which shows only the shape of the orthographic projection of the first pixel electrode 22a on the light-emitting surface of the display device as a reference, and the shape of the orthographic projection of the second pixel electrode on the light-emitting surface of the display device may refer to the first pixel shown in FIG. 5. That is, the shape of the orthographic projection of the first pixel electrode 22a on the light-emitting surface of the display device is rectangular, similarly, the shape of the orthographic projection of the second pixel electrode on the light-emitting surface of the display device is also rectangular.

The Case 1 may be applied to a scene where the second display structure needs to display a high-resolution image, that is, in order to achieve an excellent display effect when a high-resolution image is displayed, the dimming areas may be arranged to be relatively small, thus, the transition between areas with a large brightness difference in the second display structure may be fine and smooth, obvious boundaries are avoided, so that the display device has a more excellent display effect and achieves high-precision and high-contrast display.

In one embodiment, when the first display structure includes multiple gate lines G and multiple data lines D, each first pixel may include a first pixel electrode 22a and a transistor 22b. The first pixel electrode 22a is electrically connected with the gate line G through the transistor 22b, and electrically connected to the data line D through the transistor 22b, as shown in FIG. 5.

In this case, each second pixel may also include a second pixel electrode and a transistor. When the second display structure includes multiple gate lines and multiple data lines, the second pixel electrodes may be electrically connected with the gate lines through the transistors, and electrically connected to the data lines through the transistors. In other words, the connection relationships of respective structures included in the second pixels are the same as those in the first pixels, so that the structure of the second pixels may refer to FIG. 5.

In addition, for the first pixels, the placement positions of the transistors in the first pixels, the structures of the transistors, the types of the transistors and the shapes of the orthographic projections of the first pixel electrodes on the light-emitting surface of the display device may be the same as those of the second pixels.

That is, the first pixels and the second pixels are arranged to be the same in terms of included structures, the positional relationships, the connection relationships and the arrangement sizes of respective structures. In this way, on the one hand, the first display structure and the second display structure may be arranged to be exactly the same to simplify the complexity of the display device and lower the manufacturing difficulty of the display device; on the other hand, no matter what kind of images the first display structure displays, through the function of the dimming areas in the second display structure, it can ensure that the display device has an excellent display effect, and therefore different display requirements are met.

Case 2. In some embodiments of the present disclosure, the area of the orthographic projections of the first pixels on the light-emitting surface of the display device is larger than the area of the orthographic projections of the second pixels on the light-emitting surface of the display device. Each second pixel includes a second pixel electrode, and each first pixel includes at least one first pixel electrode.

Figure 6:
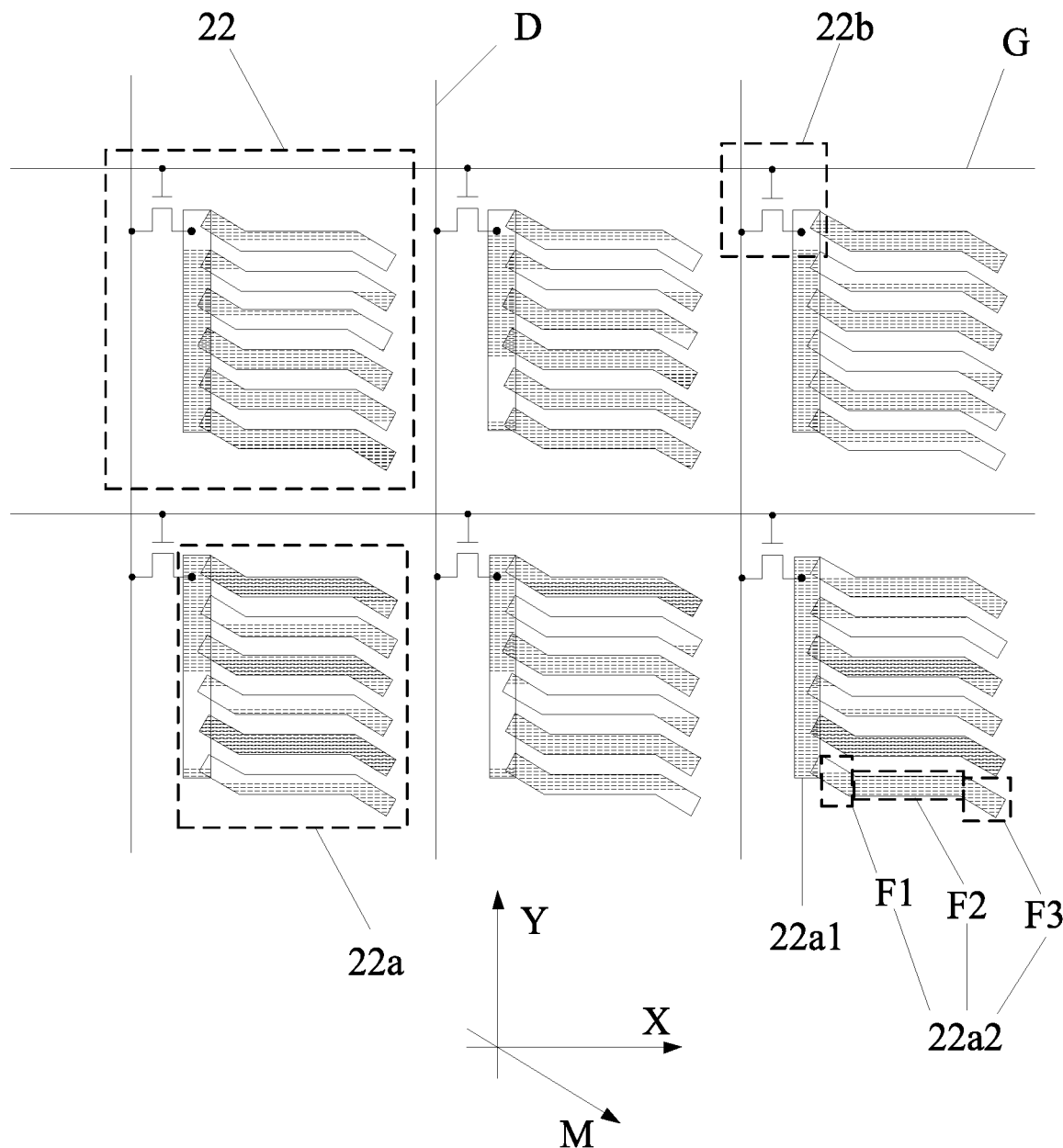
FIG. 6 is a schematic structural diagram of a second type of first pixels provided in an embodiment of the present disclosure.
Figure 7:
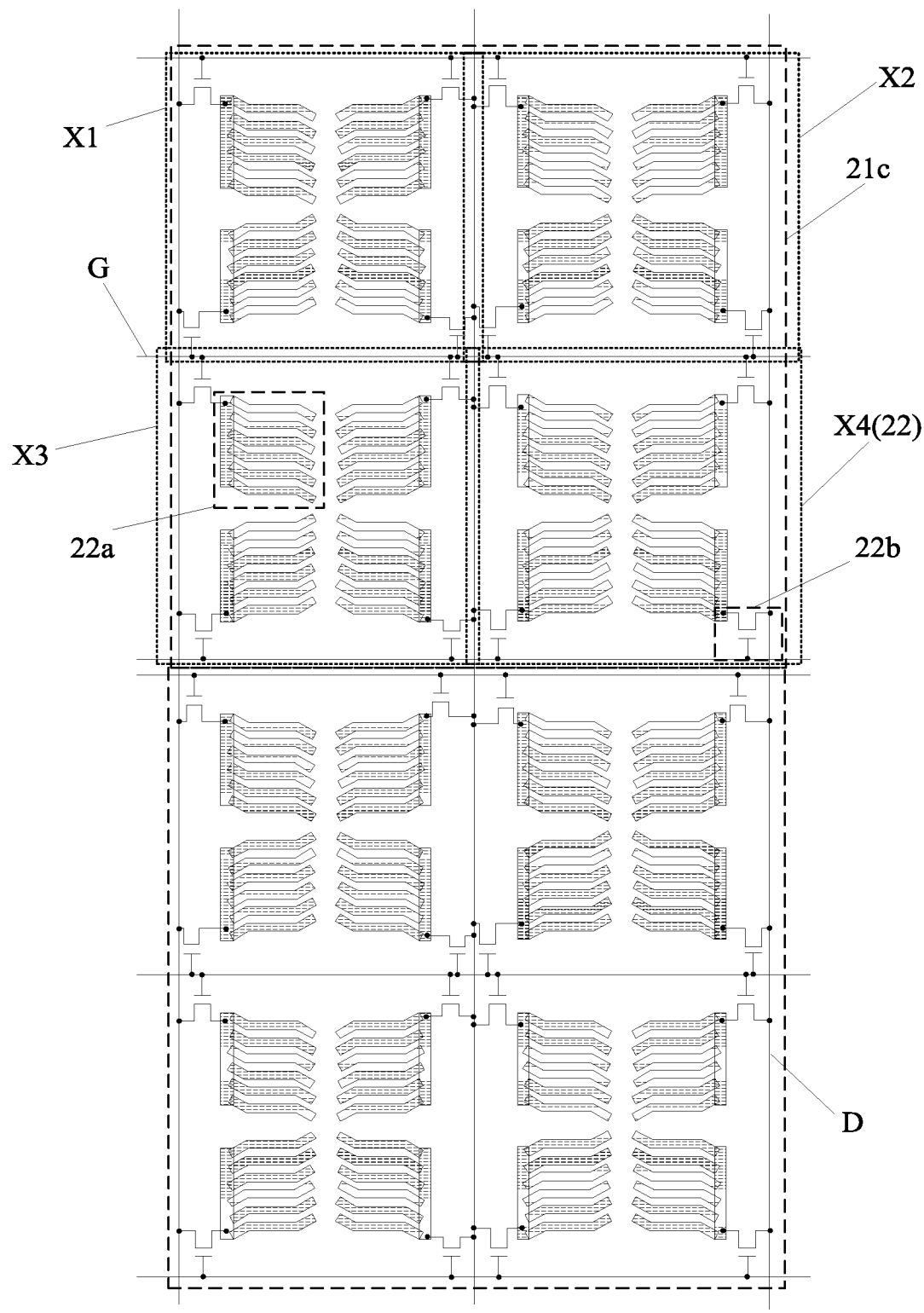
FIG. 7 is a schematic structural diagram of a third type of first pixels provided in an embodiment of the present disclosure.
Figure 8:
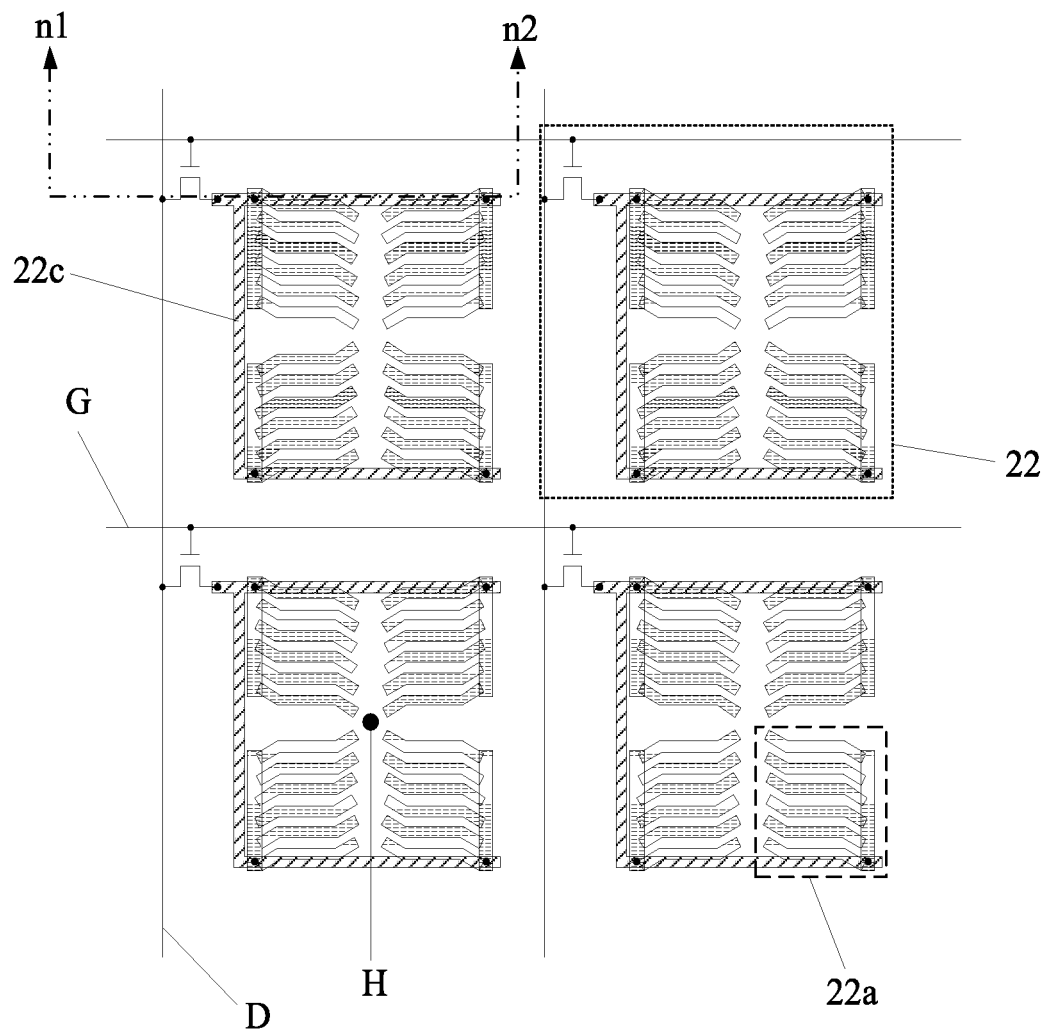
FIG. 8 is a schematic structural diagram of a fourth type of first pixels provided in an embodiment of the present disclosure.

In one embodiment, but not limited to, a schematic structural diagram of a second type of first pixels, as shown in FIG. 6, and each first pixel 22 includes a first pixel electrode 22a. As shown in FIGS. 7 and 8, FIG. 7 is a schematic structural diagram of a third type of first pixels, and FIG. 8 is a schematic structural diagram of a fourth type of first pixels, each first pixel 22 includes four first pixel electrodes 22a.

The display resolution of the second display structure applied in Case 2 is lower than the display resolution of the second display structure applied in Case 1. Since the requirement for display resolution is lowered, the area of the dimming areas may be arranged a little larger than that of the dimming areas in Case 1.

In this way, the transition between areas with a large brightness difference in the second display structure may be fine and smooth, and obvious boundaries are avoided, so that the display device has a more excellent display effect and achieves high-precision and high-contrast display. The number of dimming areas may be advantageously reduced to reduce the driving complexity of the first display structure, the driving power consumption of the first display structure is reduced, therefore, the power consumption of the display device is reduced, and the service time of the display device is prolonged.

In one embodiment of the present disclosure, although the area of the orthographic projections of the first pixels on the light-emitting surface of the display device is larger than the area of the orthographic projections of the second pixels on the light-emitting surface of the display device, there may be two cases in which the structures are arranged to be the same and the structures are arranged to be different when the structure of the first pixel and the structure of the second pixel are arranged.

When the structures of the first pixel and the second pixel are arranged to be the same, if the display resolution of the display device is 1920*1080, in order to improve the adjustment precision during regional dimming, the area of each dimming area may be arranged to be relatively small, then the division number of the dimming areas may be larger, for example, the division number of the dimming areas is from 106 to 1920*1080, and thus the structures of the first pixel and the second pixel may be arranged to be the same.

In one embodiment, structures included in the first pixel and the connection relationships of respective structures may be the same as those of the second pixel.

In one embodiment, as shown in FIG. 6, only the structures of the first pixels 22 is shown herein as a reference, and the structures of the second pixels may refer to those of the first pixels shown in FIG. 6. Each first pixel 22 includes a first pixel electrode 22a and a transistor 22b electrically connected to the first pixel electrode 22a. The first pixel electrode 22a is electrically connected to the corresponding gate line G and the corresponding data line D through the transistor 22b, respectively. Similarly, each second pixel may also include a second pixel electrode and a transistor, the second pixel electrode is electrically connected to the corresponding gate line and the corresponding data line through the transistor, respectively.

In this way, the structure complexity of the display device can be greatly simplified, and meanwhile, the manufacturing difficulty and manufacturing cost of the display device can be reduced.

When the structures of the first pixel and the second pixel are arranged to be different, if the display resolution of the display device is 1920*1080, due to influences of some process condition limitations or application scene requirements and other factors, the area of each dimming area may be arranged to be relatively large, and the division number of the dimming areas is smaller correspondingly, for example, the division number of the dimming areas is from 500 to 106. But in order to prevent excessive loads of the pixel electrodes from affecting display, the first pixels may be specially designed, that is, the structures of the first pixel and the second pixel may be arranged to be different.

In one embodiment, each first pixel 22 includes multiple first pixel electrodes 22a, and further each first pixel 22 may include multiple first pixel electrodes 22a which are axisymmetric or centrosymmetric, as shown in FIGS. 7 and 8.

In one embodiment, referring to FIG. 7 and FIG. 8, each first pixel 22 includes four first pixel electrodes 22a which are centrosymmetric along a centrosymmetric point H. In order to avoid the structures of the drawings being too complicated, only the centrosymmetric point H in the first pixel 22 in the lower left corner is shown in FIG. 8.

In some embodiments, the number of the first pixel electrodes included in each first pixel is not limited to four, but may also be two (not shown), and the two corresponding first pixel electrodes may be arranged in an axisymmetric mode, or the number may also be 3 or 5, which may be arranged as required and is not limited herein.

In this way, the display device can still have a high contrast at a large viewing angle, so that the display device has an excellent display effect at different viewing angles to be applicable to the needs of various application scenes.

In one embodiment, when the first display structure includes multiple gate lines extending in a row direction and arranged in a column direction, and multiple data lines extending in a column direction and arranged in a row direction, and each first pixel includes multiple first pixel electrodes, in order to achieve the effect that the respective first pixel electrodes in the first pixel are electrically connected to the corresponding data line and the corresponding gate line, there may be the several following arrangement modes in the embodiment of the present disclosure.

Mode S1. In some embodiments of present disclosure, the dimming areas are arranged in an array, and each dimming area includes multiple first pixels; the first pixels include transistors arranged in one-to-one correspondence with the first pixel electrodes; that is, when each first pixel includes multiple first pixel electrodes, each first pixel also includes multiple transistors correspondingly, and the transistors and the first pixel electrodes are arranged in one-to-one correspondence.

In the same dimming area, the first pixel electrodes of every two adjacent first pixels in the row direction are electrically connected to the same data line through the correspondingly arranged transistors, and the first pixel electrodes of every two adjacent first pixels in the column direction are electrically connected to the same gate line through the correspondingly arranged transistors.

In one embodiment, as shown in FIG. 7, taking the dimming area 21c as an example, the dimming area includes four first pixels, each first pixel includes four first pixel electrodes 22a and four transistors 22b, and each first pixel electrode 22a is electrically connected to the corresponding gate line G and the corresponding data line D through the correspondingly arranged transistor 22b, respectively. For illustration purpose, the four first pixels in the dimming area 21c are marked as X1, X2, X3 and X4 in order from left to right and top to bottom.

The first pixel X1 and the first pixel X2 are two adjacent first pixels in the row direction, and the two adjacent first pixel electrodes 22a of the first pixel X1 and the first pixel X2 are both electrically connected to the same data line D through the correspondingly arranged transistors 22b. Similarly, the first pixel X3 and the first pixel X4 are two adjacent first pixels in the row direction, and the two adjacent first pixel electrodes 22a of the first pixel X3 and the first pixel X4 are both electrically connected to the same data line D through the correspondingly arranged transistors 22b.

The first pixel X1 and the first pixel X3 are two adjacent first pixels in the column direction, and the two adjacent first pixel electrodes 22a in the first pixel X1 and the first pixel X3 are electrically connected to the same gate line G through the correspondingly arranged transistors 22b. Similarly, the first pixel X2 and the first pixel X4 are two adjacent first pixels in the column direction, and the two adjacent first pixel electrodes 22a of the first pixel X2 and the first pixel X4 are both electrically connected to the same gate line G through the correspondingly arranged transistors 22b.

Since each first pixel electrode 22a is electrically connected to the corresponding data line D and the corresponding gate line G through the corresponding transistor 22b, respectively, it is possible to avoid the situation that all the first pixel electrodes 22a in a first pixel do not function properly due to the fact that only one transistor 22b is arranged in the first pixel and the transistor 22b fails to work normally. Thus, the faulty area can be effectively reduced, and the reliability of the first display structure is improved.

In addition, the problem of increasing the number of data lines due to the large number of transistors and the fact that every two adjacent first pixel electrodes in the row direction are electrically connected to different data lines can be possibly avoided, the problem that the number of gate lines is increased due to the large number of transistors and the fact that every two adjacent first pixel electrodes in the column direction are electrically connected to different gate lines can be also avoided. Thus, the number of the data lines and the number of the gate lines are advantageously reduced when the number of transistors is large, then the structure of the first display structure is simplified, the manufacturing difficulty and manufacturing cost of the first display structure are reduced, and therefore the manufacturing difficulty and manufacturing cost of the display device are reduced.

Furthermore, every two adjacent first pixel electrodes in every two adjacent dimming areas in the column direction are electrically connected to different gate lines through the correspondingly arranged transistors, and every two adjacent first pixel electrodes in every two adjacent dimming areas in the row direction are electrically connected to different data lines through the correspondingly arranged transistors.

In this way, interference between the adjacent dimming areas can be avoided, therefore, adverse effects on the dimming effect are avoided, and the display effect of the display device is improved.

Mode S2. In some embodiments, each first pixel is internally provided with a connecting line electrically connected to the included first pixel electrodes, and a transistor. The connecting line and the first pixel electrodes are arranged in different layers. A gate of the transistor is electrically connected to the corresponding gate line, a source of the transistor is electrically connected to the corresponding data line, and a drain of the transistor is electrically connected to the connecting line.

In one embodiment, as shown in FIG. 8, each first pixel 22 includes four first pixel electrodes 22a, a transistor 22b and a connecting line 22c. The four first pixel electrodes 22a are electrically connected to each other through the connecting line 22c, and the connecting line 22c is electrically connected to the corresponding gate line G and the corresponding data line D through the transistor 22b, respectively, so that the four first pixel electrodes 22a are electrically connected to the corresponding gate line G and the corresponding data line D through the transistor 22b indirectly.

The configuration shape of the connecting line 22c is not limited to that shown in FIG. 8, as long as the electrical connection between the first pixel electrodes 22a and the transistor 22b can be realized, corresponding configuration shapes belong to the scope of protection of the embodiment of the present disclosure.

In this way, by arranging the connecting lines, the number of transistors in the first pixel can be reduced, therefore the space occupied by the transistors in the first pixel is reduced, the aperture ratio of the first pixel is advantageously increased, then the power consumption of the first display structure is favorably reduced, and the service time of the display device is extended.

In one embodiment, the connecting lines may be made of the same material and arranged in the same layer as the gates of the transistors, which is not shown in the figure, thus, the manufacturing process of the first display structure is advantageously simplified, and then the manufacturing difficulty of the first display structure is lowered.

Figure 9:
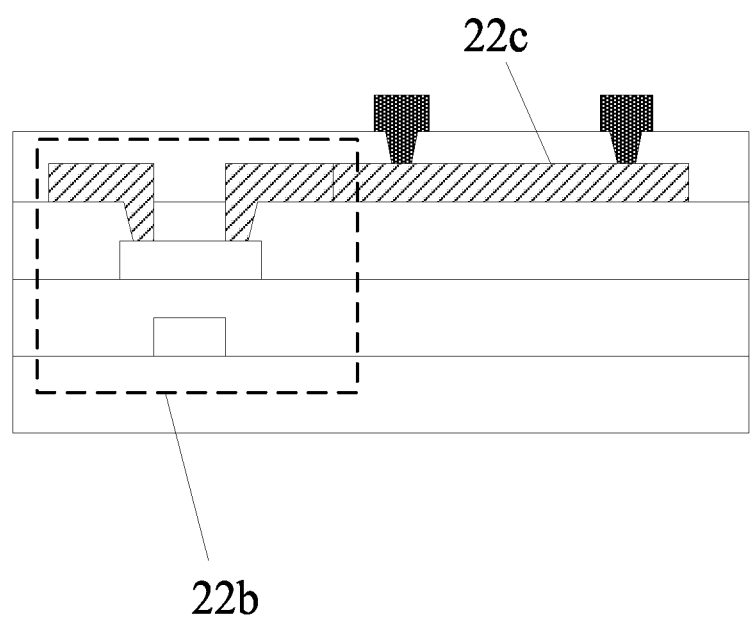
FIG. 9 is a cross-sectional view taken in the direction n1-n2 in FIG. 8.

In some embodiments, the connecting lines 22c may also be made of the same material and arranged in the same layer as the sources and/or drains of the transistors 22b, as shown in FIG. 9 which is a cross-sectional view in the n1-n2 direction in FIG. 8. In this case, the connecting lines 22c may make direct contact and be electrically connected with the drains of the transistors 22b without electrical connection through via holes, which not only simplify the structure of the first display structure and reduces the manufacturing difficulty of the first display structure, but also ensures the effective contact between the connecting lines 22c and the drains of the transistors 22b, thus, the problem of insufficient contact due to the small size of the via holes when the via holes are adopted for electrical connection is avoided, and ensuring effective signal transmission.

In Case 2, the arrangement results when the structure of the first pixels and the structure of the second pixels are the same or different are introduced, but regardless of whether the structure of the first pixels and the structure of the second pixels are the same, the orthographic projection of the first pixel electrodes and the orthographic projection of the second pixel electrodes on the light-emitting surface of the display device may be in the same shape.

In one embodiment of the present disclosure, the orthographic projection of the first pixel electrodes and the orthographic projection of the second pixel electrodes on the light-emitting surface of the display device may be arranged in the following shapes.

As shown in FIG. 6, the first pixel electrodes 22a and the second pixel electrodes each includes a first section 22a1 and multiple second sections 22a2, and the multiple second sections 22a2 are all electrically connected to the first section 22a1. The first section 22a1 extends in a first direction, the multiple second sections 22a2 are arranged in the first direction, and the second sections 22a2 are arranged at intervals.

Each second section 22a2 includes a first segment F1, a second segment F2 and a third segment F3 which are connected. The first segment F1 is electrically connected to the first section 22a1, the second segment F2 is arranged between the first segment F1 and the third segment F3, the first segment F1 extends in a first sub-direction, the second segment F2 extends in a second sub-direction, and the third segment F3 extends in a third sub-direction.

The first direction is the row direction, the second sub-direction is the column direction, and the first sub-direction and the third sub-direction are parallel to each other and intersect with the row direction and the column direction respectively. Or, the first direction is the column direction, the second sub-direction is the row direction, and the first sub-direction and the third sub-direction are parallel to each other and intersect with the row direction and the column direction respectively.

In one embodiment, but not limited to, as shown in FIG. 6, the X direction represents the row direction, the Y direction represents the column direction, the M direction represents the first sub-direction, and it should be noted that the X direction, the Y direction and the M direction are all located in the same plane. Since the first sub-direction and the third sub-direction are parallel, the M direction may also represent the third sub-direction. The first section 22a1 extends in the Y direction, the first segment F1 and the third segment F3 in the second section 22a2 both extend in the M direction, the second segment F2 extends in the X direction, the first segment F1 in the second section 22a2 is connected to the first section 22a1, and the second segment F2 connects the first segment F1 to the third segment F3.

That is, the orthographic projections of the first pixel electrodes and the second pixel electrodes on the light-emitting surface of the display device may be in the same shape (the shape shown in FIG. 6), but the first pixel electrodes and the second pixel electrodes are different in size. In this way, since the size of the first pixel electrodes is relatively large, the manufacturing difficulty is reduced, the yield of manufactured products increases accordingly, and therefore the manufacturing yield of the display device can greatly increase.

The arrangement of the dimming areas is described below.

In one embodiment, in order to achieve regional dimming, in the embodiments of the present disclosure, the dimming areas may be arranged in the several following modes during arrangement.

Mode K1. In some embodiments of the present disclosure, the orthographic projections of the dimming areas on the light-emitting surface of the display device may be set in the same shape, and the areas may also be set to the same.

In one embodiment, as shown in FIG. 3, each dimming area 21 is square, and each dimming area 21 includes nine first pixels 22.

In another embodiment, as shown in FIG. 2, the dimming area 21 is rectangular. Moreover, when the display device is also rectangular, the length-width ratio of the dimming areas 21 and the length-width ratio of the display device may be set to be the same. If the length-width ratio of the display device is 16:9, the length-width ratio of the dimming areas may also be set to 16:9.

Only a part of the first pixels 22 are shown in FIGS. 2 and 3, and the number of the first pixels 22 arranged in the first display structure is not limited to those shown in FIGS. 2 and 3, and correspondingly, the number of dimming areas 21 is not limited to those shown in FIGS. 2 and 3 either.

In this way, the dimming areas may be arranged according to the needs, and the arrangement flexibility is improved; and since the areas of the dimming areas are the same, the difficulty of controlling the dimming areas can be lowered, and therefore the difficulty of driving the first display structure is lowered.

Mode K2. In some embodiments of the present disclosure, the first display structure includes a first display area and a second display area surrounding the first display area. The dimming areas include multiple first subareas and multiple second subareas, the multiple first subareas are located in the first display area, and the multiple second subareas are located in the second display area, and the area of the second subareas is smaller than the area of the first subareas.

In one embodiment, but not limited to, as shown in FIG. 4, A represents the entire display area, A1 represents the first display area located in the center of the entire display area, and the area other than the first display area A1 in the entire display area A is the second display area and is not indicated with a mark in the figure. The first subareas in the first display area A1 are denoted by 21b, and each first subarea 21b includes six first pixels 22. The second subareas located in the second display area are denoted by 21a, moreover, each second subarea 21a includes at least one first pixel 22 and at most three first pixels 22.

Furthermore, the areas and shapes of the second subareas are not set to be the same for all the second subareas, and may be set according to actual conditions, which are not limited herein. In addition, the areas and shapes of all the first subareas are set to be the same, such as rectangles in FIG. 4, but are not limited to rectangles.

In other words, if the sum of the first display area and the second display area is regarded as the entire display area, then the second display area may be regarded as an edge area of the entire display area, the first display area may be regarded as a central area of the entire display area, the area of the second subareas located in the second display area is set to be relatively small, so that the edge area of the entire display area may be finely adjusted, thus, undesirable phenomena such as jagged edges of the display device can be eliminated, and the display effect of the display device is improved.

It should be noted that the entire display area in the first display structure may be an area corresponding to the display area in the second display structure, and the areas may be set to be exactly the same. In this way, the effect of regional dimming achieved through the first display structure can be ensured, the display effect of the second display structure is improved, and the problem of edge light leakage or poor edge display effect caused by different areas or misalignment can be avoided, and therefore the display effect of the display device is improved.

Based on the above description, no matter which of the above-mentioned arrangement modes for the dimming areas is adopted, the transmittance of backlight emitted by the backlight device 10 can be well controlled and adjusted through the dimming areas. For example, if the resolution of the display device is 1920*1080, the division number of the dimming areas may be from 500 to 1920*1080, if the division number of the dimming areas is 14,400, and when the areas of the dimming area are the same, the number of the first pixels comprised in each dimming area may be 144.

Therefore, through the regional dimming function of the dimming areas, when the display device needs to display a high-resolution image, high-precision and high-contrast display can be achieved through the dimming areas, so that the display effect is effectively improved.

In one embodiment of the present disclosure, the first display structure and the second display structure may be arranged in several types during specific structure arrangement.

Figure 10:
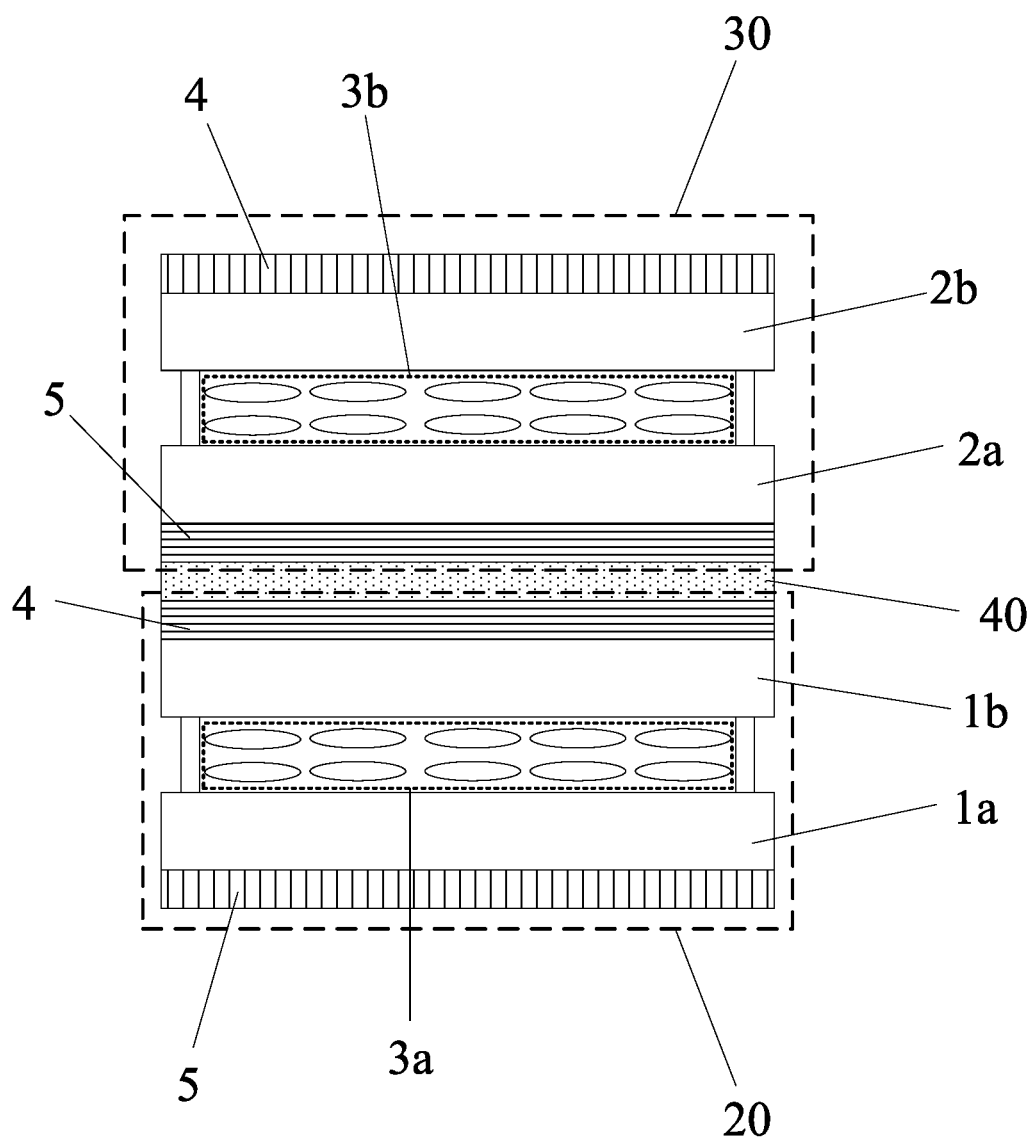
FIG. 10 is a schematic structural diagram of a first type of a display device provided in an embodiment of the present disclosure.

The first type. In some embodiments, the first display structure 20 and the second display structure 30 may both be liquid crystal display panels, as shown in FIG. 10 which is a schematic structural diagram of a first type of a display device. In this case, a transparent adhesive layer 40 is arranged between the first display structure 20 and the second display structure 30, and the first display structure 20 and the second display structure 30 are fixed and bonded by the transparent adhesive layer. The transparent adhesive layer 40 may be, but is not limited to, a polyvinyl alcohol (PVA) adhesive material.

Figure 11:
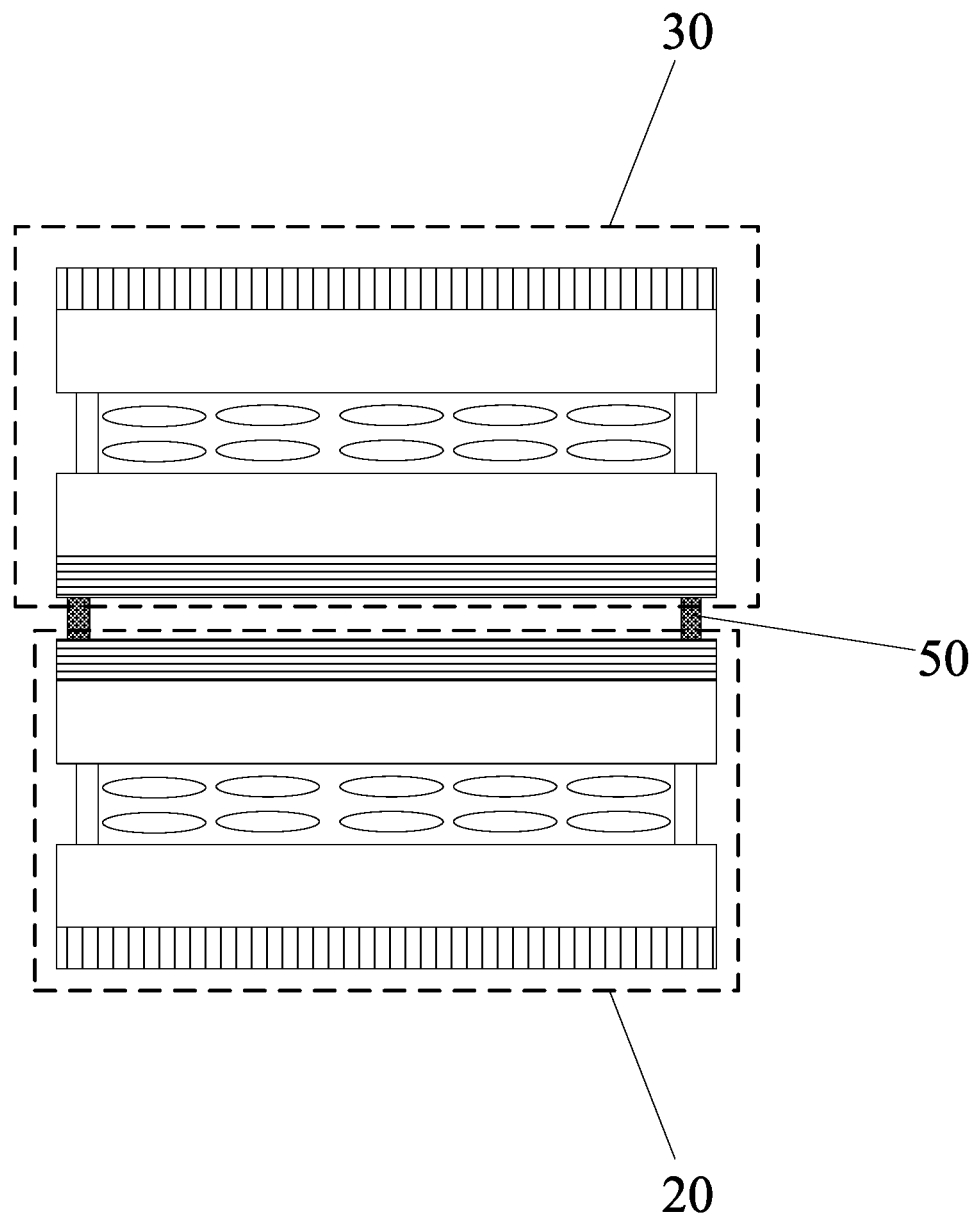
FIG. 11 is a schematic structural diagram of a second type of a display device provided in an embodiment of the present disclosure.

In some embodiments, the first display structure 20 and the second display structure 30 may also be fixed by frame glue 50, as shown in FIG. 11 which is a schematic structural diagram of a second type of a display device, in this case, the frame glue 50 may be internally provided with other materials (not shown), and may also be filled with air (as shown in FIG. 11). The frame glue 50 may be made of any material that can achieve packaging and bonding effects, which is not limited herein.

In one embodiment, no matter which bonding mode is adopted, the first display structure 20, as shown in FIG. 10, includes a first substrate 1a, a second substrate 1b opposite to the first substrate 1a, a first liquid crystal 3a located between the first substrate 1a and the second substrate 1b, an upper polarizer 4 located on the side, away from the first substrate 1a, of the second substrate 1b, and a lower polarizer 5 located on the side, away from the second substrate 1b, of the first substrate 1a. The first substrate 1a may be an array substrate, and the second substrate 1b may be an opposite substrate.

The second display structure 30 includes a third substrate 2a, a fourth substrate 2b opposite to the third substrate 2a, a second liquid crystal 3b located between the third substrate 2a and the fourth substrate 2b, an upper polarizer 4 located on the side, away from the third substrate 2a, of the fourth substrate 2b, and a lower polarizer 5 located on the side, away from the fourth substrate 2b, of the third substrate 2a. The third substrate 2a may be an array substrate, and the fourth substrate 2b may be an opposite substrate.

For the two polarizers belonging to the same display structure, the polarization directions of polarized lights passing through the upper polarizer 4 and the lower polarizer 5 are perpendicular. And, for the lower polarizer 5 of the first display structure 20 and the upper polarizer 4 of the second display structure 30, the polarization directions of polarized lights passing through the two polarizers are parallel. In this case, the display function is conveniently achieved.

Figure 12:
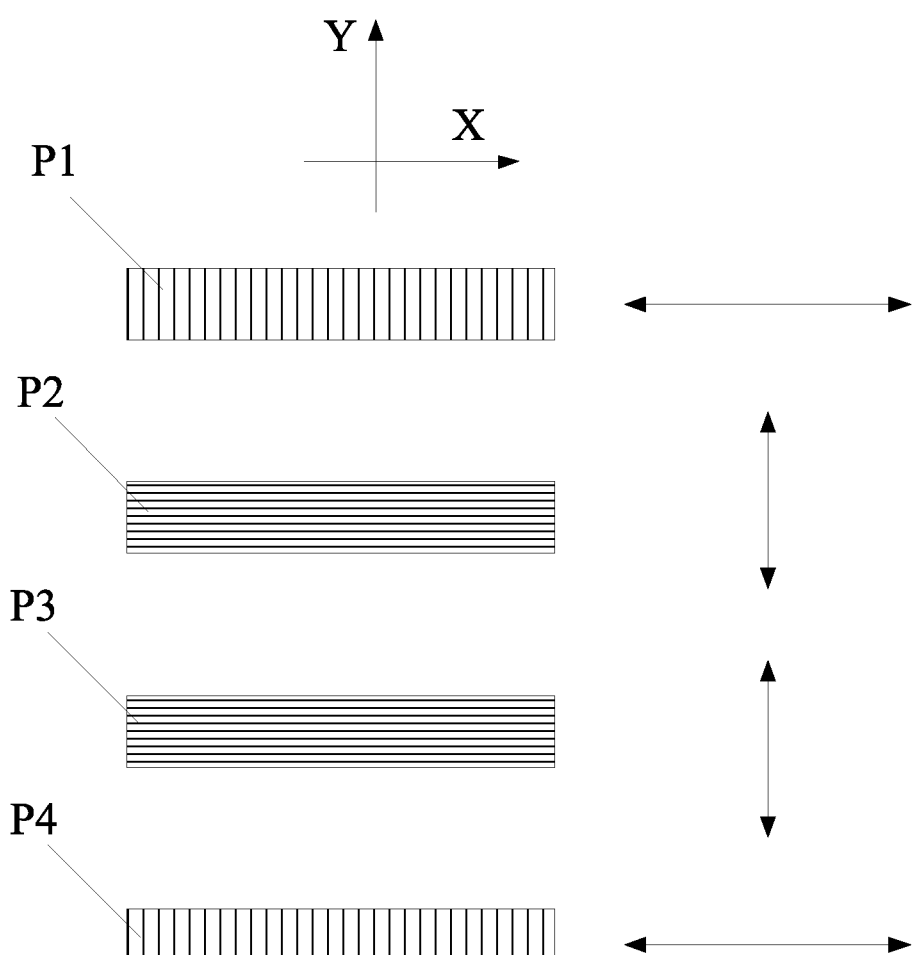
FIG. 12 is a schematic diagram of light polarization directions of the respective polarizers corresponding to FIG. 10 and FIG. 11.

In one embodiment, but not limited to, as shown FIG. 12, a schematic diagram of light polarization directions of the respective polarizers corresponding to FIG. 10 and FIG. 11, and only four polarizers are shown in the figure. If the upper polarizer and the lower polarizer included in the first display structure 20 are marked as P3 and P4 respectively, and the upper polarizer and the lower polarizer included in the second display structure 30 are marked as P1 and P2, respectively, then when the polarization direction of polarized lights transmitted through P1 is the X direction, the polarization direction of polarized lights transmitted through P2 is the Y direction, the polarization direction of polarized lights transmitted through P3 is the Y direction, and the polarization direction of polarized lights transmitted through P4 is the X direction.

It should be noted that the deflection directions of the first liquid crystal 3a included in the first display structure 20 and the second liquid crystal 3b included in the second display structure 30 may be set according to needs, as long as the display function can be achieved, corresponding setting modes fall within the scope of protection of the embodiments of the present disclosure.

Since the first display structure and the second display structure are both liquid crystal display panels and are basically similar in structure, the first display structure and the second display structure may be manufactured simultaneously, so that the manufacturing efficiency of the display device is conveniently improved.

The second type. In some embodiments of the present disclosure, as shown in the schematic structural diagram of a third type of a display device shown in FIG. 13 and the schematic structural diagram of a fourth type of a display device shown in FIG. 14, the display device includes a first polarizer 6, a second polarizer 7 and a third polarizer 8.

The first polarizer 6 is arranged on the side, away from the backlight device 10, of the second display structure 30, the second polarizer 7 is arranged between the first display structure 20 and the second display structure 30, and the third polarizer 8 is arranged on the side, close to the backlight device 10, of the first display structure 20.

Polarized lights transmitted through the first polarizer 6 and polarized lights transmitted through the second polarizer 7 are perpendicular to each other, and polarized lights transmitted through the first polarizer 6 and polarized lights transmitted through the third polarizer 8 are parallel to each other.

That is, the display device includes three polarizers, where the light polarization directions of the first polarizer 6 and the third polarizer 8 are the same, and the light polarization directions of the first polarizer 6 and the second polarizer 7 are perpendicular.

In this way, by arranging the three polarizers, the display function of the display device can be achieved, the structure of the display device is simplified, and a lightening and thinning design is advantageously achieved.

Figure 13:
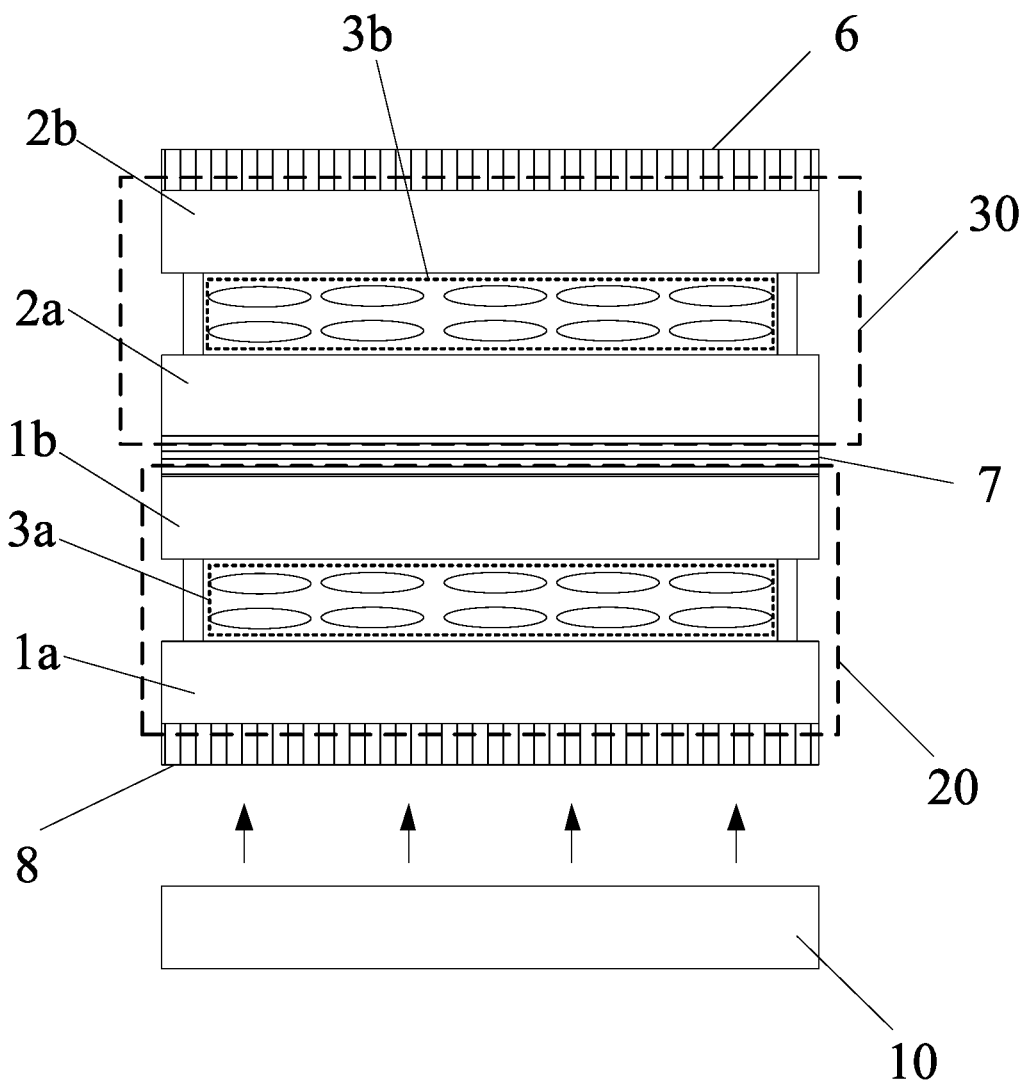
FIG. 13 is a schematic structural diagram of a third type of a display device provided in an embodiment of the present disclosure.

In one embodiment, as shown in FIG. 13, the first display structure 20 may include a first substrate 1a, a second substrate 1b opposite to the first substrate 1a, and a first liquid crystal 3a arranged between the first substrate 1a and the second substrate 1b. The first substrate 1a may be understood as an array substrate, and the second substrate 1b may be understood as an opposite substrate.

In this case, the second display structure 30 may include a third substrate 2a, a fourth substrate 2b opposite to the third substrate 2a, and a second liquid crystal 3b located between the third substrate 2a and the fourth substrate 2b; and the third substrate 2a includes pixel electrodes, and the third substrate 2a is close to the second substrate 1b. The third substrate 2a may also be understood as an array substrate, and the fourth substrate 2b may be understood as an opposite substrate.

It should be noted that the number of polarizers of the display device shown in FIG. 13 is different from those of the display devices shown in FIGS. 11 and 12, further, the display device shown in FIG. 13 includes fewer polarizers, thus, the thickness of the display device can be advantageously reduced, and a lightening and thinning design can be achieved.

The third type. In some embodiments, the display device also includes a first polarizer, a second polarizer and a third polarizer, and the positions and functions of the three polarizers are the same as the second type described above. This type of structure differs from the second type of structure described above in that the first display structure includes one substrate rather than two substrates.

Figure 14:
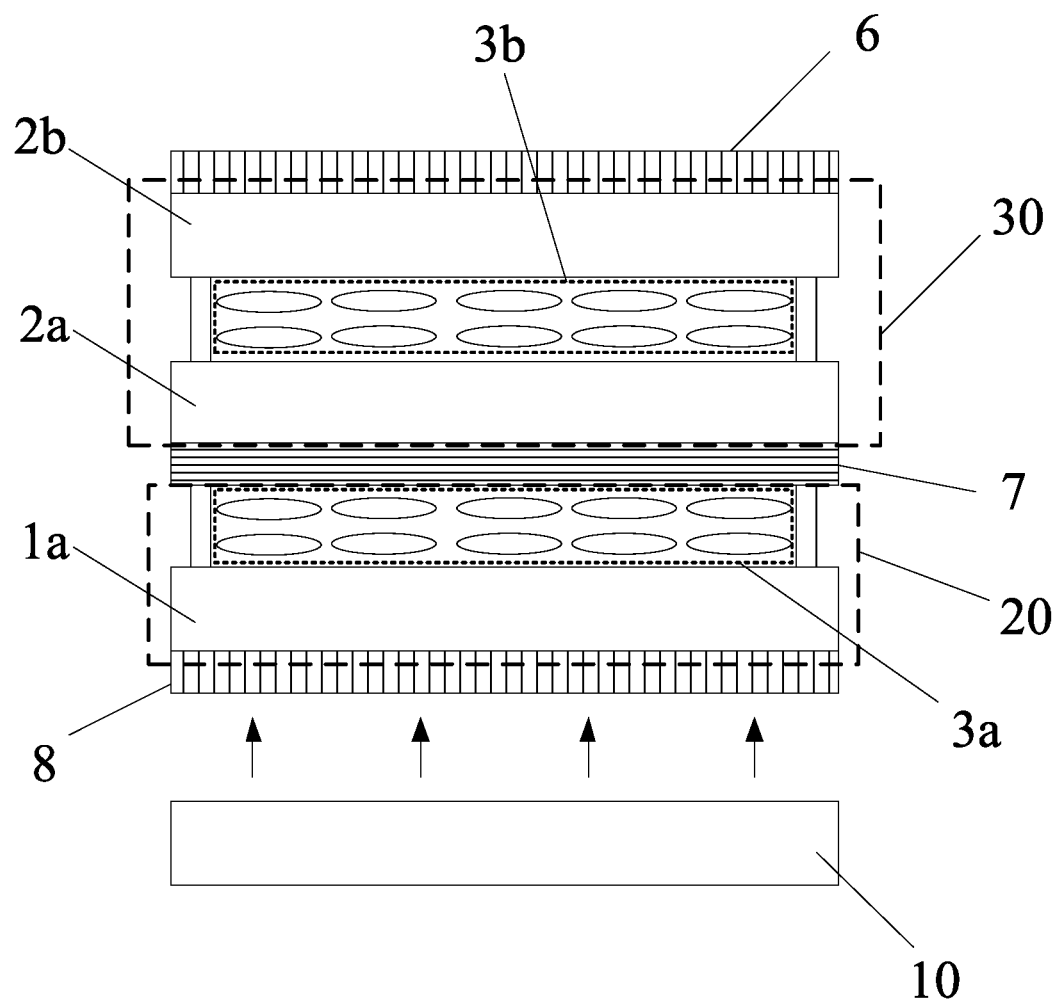
FIG. 14 is a schematic structural diagram of a fourth type of a display device provided in an embodiment of the present disclosure.

In one embodiment, the structure of the display device may also be shown in FIG. 14, the first display structure 20 may include a first substrate 1a, and a first liquid crystal 3a arranged between the first substrate 1a and a second polarizer 7. The first substrate 1a may be understood as an array substrate.

The second display structure 30 includes a third substrate 2a, a fourth substrate 2b opposite to the third substrate 2a, and a second liquid crystal 3b located between the third substrate 2a and the fourth substrate 2b; the third substrate 2a includes pixel electrodes, and the third substrate 2a is close to the first substrate 1a. The third substrate 2a may also be understood as an array substrate, and the fourth substrate 2b may be understood as an opposite substrate.

In addition, the first substrate 1a includes pixel electrodes and common electrodes, which are not shown in FIG. 14; and the pixel electrodes and the common electrodes are both for driving the first liquid crystal to deflect.

It should be noted that the number of substrates of the display device shown in FIG. 14 is different from that of the display device shown in FIG. 13, further, the number of substrates included in the display device shown in FIG. 14 is smaller, in this way, the thickness of the display device can be advantageously reduced, and a lightening and thinning design can be achieved.

Furthermore, in the third type, the first display structure does not include an opposite substrate, the problem of loss of lights emitted by the first display structure due to the opposite substrate does not occur, so that the display device has a better display effect.

It should be noted that in FIG. 13, the first display structure 20 includes the opposite substrate (namely the second substrate 1b), and the first liquid crystal 3a is located between the opposite substrate and the array substrate (namely the first substrate 1a); and in FIG. 14, the first display structure 20 does not include the opposite substrate (namely the second substrate 1b), so that the second liquid crystal 3b is located between the array substrate and the second polarizer 7.

In the embodiments of the present disclosure, the backlight device may be arranged in the two following structures.

In one embodiment, the backlight device may include an edge light source and a light guide plate located on a light-emitting surface of the edge light source, which are not shown in the figure. The light guide plate may change the propagation direction of lights emitted by the edge light source, and therefore lights are emitted from the light-emitting surface of the backlight device and enter the first display structure.

In this case, the backlight device of this structure may be called an edge backlight device.

Since the manufacturing cost of the backlight device of this structure is lower than that of a direct backlight device (described in the following content), the manufacturing cost of a display device composed of the edge backlight device is lower, meanwhile, high-precision and high-contrast display can be achieved, and the display effect is effectively improved.

In addition to the edge light source and the light guide plate, the backlight device also includes other structures for achieving the functions of the backlight device, and specific structures may refer to the description of the backlight device in the prior art and are not described in detail herein.

In one embodiment, the backlight device may include a light source substrate, light sources arranged in an array are arranged on the light source substrate, the light sources may be composed of LEDs, and the light source substrate may also be referred to as an LED substrate, which is not shown in the figure.

Lights emitted by the light sources are directly emitted from the light-emitting surface of the backlight device, so the backlight device of this structure may be called a direct backlight device.

Although the manufacturing cost of the backlight device of this structure is higher than that of the above-mentioned edge backlight device, the direct backlight device can achieve regional dimming, thus, a display device composed of the backlight device of this structure can achieve regional dimming through both the backlight device and the first display structure, thus, the display contrast is further increased, and the display effect is improved.

In addition to the light source substrate, the backlight device also includes other structures for achieving the functions of the backlight device, and specific structures may refer to the description of the backlight device in the prior art and are not described in detail herein.

What is claimed is:

1. A display device, comprising:
a backlight device,
a first display structure located above a light-emitting surface of the backlight device, and
a second display structure located above a side, away from the backlight device, of the first display structure;
wherein the first display structure and the second display structure are opposite to each other;
the first display structure comprises first pixels arranged in an array;
the second display structure comprises second pixels arranged in an array; and
an area of orthographic projections of the first pixels on a light-emitting surface of the display device is larger than an area of orthographic projections of the second pixels on the light-emitting surface of the display device;
wherein each of the second pixels comprises a second pixel electrode;
each of the first pixels comprises:
multiple first pixel electrodes which are axisymmetric; or
multiple first pixel electrodes which are centrosymmetric; and
wherein the first pixels are divided into multiple dimming areas,
each of the multiple dimming areas comprises at least one of the first pixels; and
the first display structure is for adjusting a transmittance of each of the multiple dimming areas for lights emitted by the backlight device according to an image to be displayed in a next frame of the second display structure;
wherein the first display structure comprises a first display area and a second display area surrounding the first display area; and
the multiple dimming areas comprise multiple first subareas and multiple second subareas; and
wherein the multiple first subareas are located in the first display area, and the multiple second subareas are located in the second display area; and
an area of the multiple second subareas is smaller than an area of the multiple first subareas;
wherein the first pixel electrode of the first display structure and second pixel electrode of the second display structure each comprises a first section and multiple second sections, and the multiple second sections are electrically connected to the first section, and
wherein the first section extends in a first direction, and the multiple second sections are arranged in the first direction, and the multiple second sections are arranged at intervals; and
wherein each of the multiple second sections comprises a first segment, a second segment and a third segment which are connected,
the first segment is electrically connected to the first section, the second segment is arranged between the first segment and the third segment, and
the first segment extends in a first sub-direction, the second segment extends in a second sub-direction, and the third segment extends in a third sub-direction; and
wherein the first direction is a row direction, the second sub-direction is a column direction, and the first sub-direction and the third sub-direction are parallel to each other and intersect respectively with the row direction and the column direction; or
wherein the first direction is a column direction, the second sub-direction is a row direction, and the first sub-direction and the third sub-direction are parallel to each other and intersect respectively with the row direction and the column direction.

2. The display device of claim 1, wherein the first display structure comprises:
multiple gate lines extending in a row direction and arranged in a column direction, and
multiple data lines extending in a column direction and arranged in a row direction;
the multiple dimming areas are arranged in an array, and each of the multiple dimming areas comprises multiple first pixels; and the multiple first pixels comprise transistors corresponding to first pixel electrodes; and
in a same dimming area:
first pixel electrodes of every two adjacent first pixels in a row direction are electrically connected to a same data line through correspondingly arranged transistors, and
first pixel electrodes of every two adjacent first pixels in a column direction are electrically connected to a same gate line through correspondingly arranged transistors.

3. The display device of claim 1, wherein the first display structure comprises:
multiple gate lines extending in a row direction and arranged in a column direction, and
multiple data lines extending in a column direction and arranged in a row direction;
for each of the first pixels, wherein:
each of the first pixels comprises multiple first pixel electrodes, and is internally provided with a connecting line electrically connected to the multiple first pixel electrodes, and a transistor;
the connecting line and the multiple first pixel electrodes are arranged in different layers; and
a gate of the transistor is electrically connected to a corresponding gate line, a source of the transistor is electrically connected to a corresponding data line, and a drain of the transistor is electrically connected to the connecting line.

4. The display device of claim 3, wherein:
the connecting line is made of a same material as one or more of: the source and the drain of the transistor; and
the connecting line is arranged in a same layer as one or more of: the source and the drain of the transistor.

5. The display device of claim 1, wherein:
the multiple first subareas are square, or
an orthographic projection of the first display structure on the light-emitting surface of the display device is rectangular, and a length-width ratio of each of the multiple first subareas is equal to that of the first display structure; and
the multiple second subareas are rectangular.

6. The display device of claim 1, wherein the first display structure and the second display structure are both liquid crystal display panels; and
a transparent adhesive layer is arranged between the first display structure and the second display structure.

7. The display device of claim 1, wherein the display device comprises a first polarizer, a second polarizer and a third polarizer;
    the first polarizer is arranged on a side, away from the backlight device, of the second display structure,
    the second polarizer is arranged between the first display structure and the second display structure, and
    the third polarizer is arranged on a side, close to the backlight device, of the first display structure; and
        wherein polarized lights transmitted through the first polarizer and polarized lights transmitted through the second polarizer are perpendicular to each other, and
        the polarized lights transmitted through the first polarizer and polarized lights transmitted through the third polarizer are parallel to each other.

8. The display device of claim 7, wherein:
the first display structure comprises a first substrate and a first liquid crystal arranged between the first substrate and the second polarizer; and
the second display structure comprises a third substrate, a fourth substrate opposite to the third substrate, and a second liquid crystal located between the third substrate and the fourth substrate; and
    wherein the third substrate comprises pixel electrodes, and the third substrate is close to the first substrate.

9. The display device of claim 8, wherein the first substrate comprises pixel electrodes and common electrodes; and
    the pixel electrodes and the common electrodes are both for driving the first liquid crystal to deflect.

\* \* \* \* \*